Figure 2:
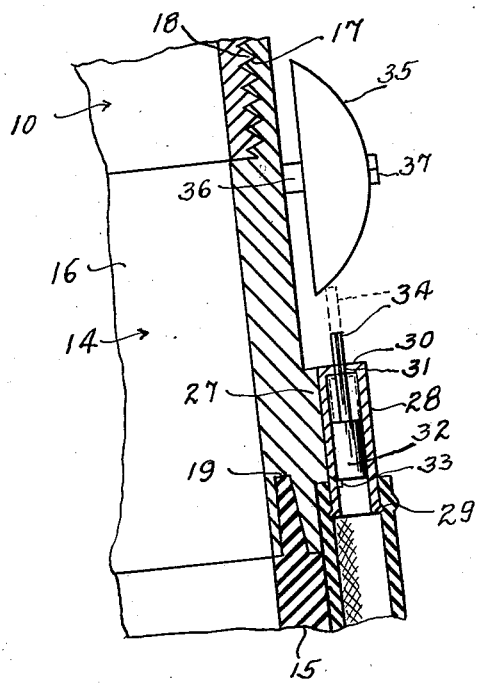

June 18, 1940.   E. D. FEATHERSTON   2,205,351
FULL FLOW FULL TANK NOZZLE SPOUT
Filed April 25, 1939

Inventor
E. D. Featherston
By Kimmel & Crowell
Attorneys

Patented June 18, 1940

2,205,351

UNITED STATES PATENT OFFICE 2,205,351

FULL FLOW FULL TANK NOZZLE SPOUT

Edgar D. Featherston, Richmond, Ind.

Application April 25, 1939, Serial No. 270,028

2 Claims. (Cl. 226—66)

This invention relates to signaling devices and more particularly to a pressure operated signal.

An object of this invention is to provide a signaling device for use in combination with a liquid filling nozzle to indicate the filled condition of a receptacle.

At the present time motor vehicles are provided with tanks for the fuel which have substantially long and frequently curved or angular filler pipes which render it difficult for an attendant to determine when the tank is completely filled without causing the liquid to spill out of the filler pipe. It is, therefore, an object of this invention to provide a signaling device which is adapted to be connected to a filler nozzle and insertible within a filler pipe, the signaling device being actuated by air pressure so that the attendant may readily determine the filled condition of the fuel tank without spilling any of the fuel through the filler pipe.

Another object of this invention is to provide a signaling device in the form of an attachment for a fluid nozzle to take the place of the present flexible discharge hose, the attachment being so constructed that it may be inserted through the filler pipe of the fuel tank and the signal will be operable by air pressure within the tank as the tank approaches a filled condition.

A further object of this invention is to provide a signal attachment of this kind which may be secured to conventional hose nozzles, the attachment being so constructed that the fuel may be discharged into the tank under full pressure from the fuel pump, the fuel flow of the fuel being continued until the tank has been completely filled.

With the foregoing and other objects in view, my invention consists of the novel construction, combination and arrangement of parts as hereinafter more specifically described and illustrated in the accompanying drawing, but it is to be understood that changes, variations and modifications may be restored to which fall within the scope of my invention as claimed.

Figure 1:
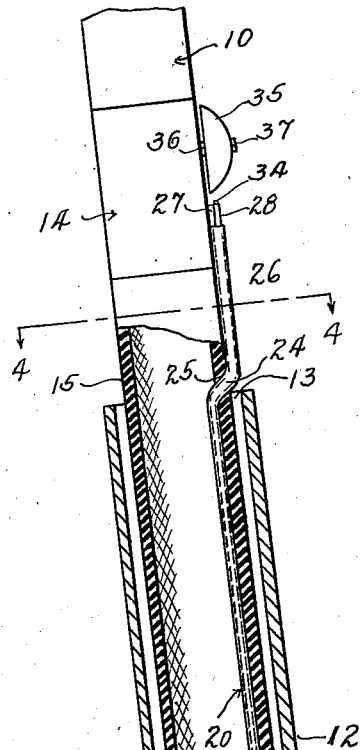
Figure 4:
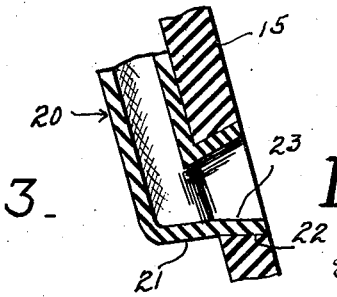
Figure 3:
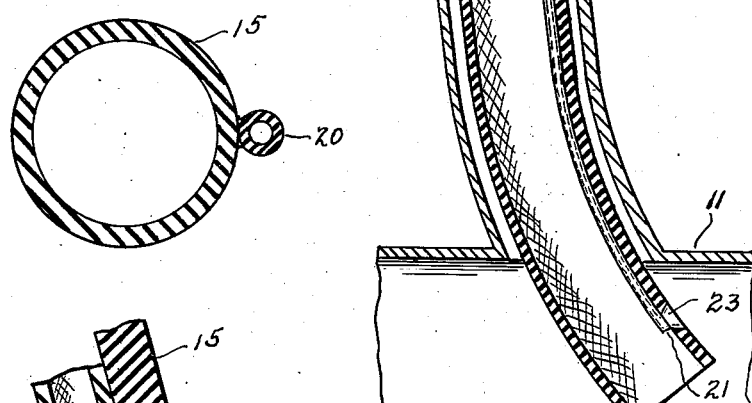

In the drawing:

Figure 1 is a longitudinal section partly broken away and in elevation of a signaling device constructed according to an embodiment of this invention mounted on a filler nozzle, Figure 2 is an enlarged fragmentary sectional view of the upper end of the signaling device, Figure 3 is an enlarged fragmentary sectional view of the lower portion of the signaling device, and Figure 4 is a sectional view taken on the line 4—4 of Figure 1.

Referring to the drawing, the numeral 10 designates generally a nozzle connected by suitable means to a pump or filler means. The nozzle 10 may include the conventional valve structure associated directly therewith so that the attendant in filling a fuel tank of a vehicle or the like can readily cut off or turn on the liquid at substantially the point of discharge.

At the present time motor vehicles are provided with a tank 11 having a substantially long filler pipe or neck 12. This filler pipe or neck 12 is frequently bent longitudinally in order to position the outer end of the pipe 12 at a convenient location for discharging fuel into the tank 11. With a construction of this kind it is difficult for the attendant to know when the tank 11 has been properly filled without causing a considerable quantity of fuel to be spilled out of the neck or pipe 12 due, in great part, to back pressure formed in the tank 11.

In order, therefore, to provide a means whereby the attendant filling the tank 11 may readily determine the filled condition of the tank 11 and whereby back pressure may be eliminated, I have provided a flexible filler device generally designated as 14 which is adapted to be inserted into the open end 13 of the pipe 12. The filler device 14 comprises a fluid conducting element in the form of an elongated flexible tubular member 15 which at its inner end is provided with a coupling sleeve 16 having threads 17 adapted to engage threads 18 carried by the nozzle 10. The coupling member 16 is provided with an annular groove 19 in its outer end in which the inner end terminal portion of the tubular member 15 is crimped or otherwise secured. The tubular member 15 has correlated therewith a substantially small air tube 20 extending longitudinally thereof and with the major portion of the length of tube 20 arranged within the member 15. The lower or outer end terminal portion of the air tube 20 is bent laterally as at 21 and extended through an opening 22 provided in the member 15 at a point inwardly from the discharge end of the latter and opens at the outer periphery of the member 15 for the intake of air. The laterally extending portion 21 of the air tube 20 in the present instance may be flared as at 23 and this flared portion may be adhesively secured or vulcanized to the marginal portions of the opening 22 in the member 15.

The air tube 20 is provided with a bend 24 which extends through an opening 25 provided in the member 15 at a point adjacent the inner end thereof and the remaining portion of the tube 20 is then extended longitudinally of the exterior of the member 15 as at 26. This exterior portion 26 may be adhesively secured to the outer surface of the flexible member 15 so as to tightly hold the inner end of the air tube in a fixed position relative to the member 15. That part of the tube 20 between its end terminal portion 21 and the bend 24 is arranged against the inner face of member 15.

A metallic cylinder 28 provided at its lower or outer end with a bead 29 is adapted to partly telescope into the upper or inner end of the tube portion 26 and the cylinder 28 is provided with a head or end wall 30 having an opening 31. The cylinder 28 is secured to a peripheral offset part 27 of the coupling 17. A piston 32 is slidable in the cylinder 28 and preferably the cylinder 28 may have a stop member 33 limiting the inward movement of the piston or plunger 32. A striker 34 is formed integral with the plunger or piston 32 and is slidable through the opening 31 in the piston head 30. A bell or audible signal member 35 is positioned in the path of the movement of the striker 34, being mounted on and secured to a post 36 as by a fastening member 37. The post 36 is carried by the coupling sleeve 16.

In the use and operation of this device the attendant is adapted to extend the member 15 into the pipe 12 so that the inner open end of the air tube or pipe 20 will be within the upper portion of the tank 11. The flexible member 15 may be covered on the exterior thereof with a metal sheeting for contact with the neck 12 to discharge or ground any static present or generated in the tank 11. The tank 11 may then be filled in the normal manner. As the tank 11 becomes filled, the air pressure in the upper portion of the tank 11 will increase due to the force of the incoming fuel, and a portion of the air will be discharged between the exterior surface of the tube 15 and the interior surface of the filler pipe 12. As the air pressure increases in the tank 11, the air will be placed under pressure in the air tube or pipe 20 and this pressure will force the piston 32 upwardly in the cylinder 28. Upward movement of the piston 32 will cause the striker 34 to contact with the bell or signal member 35, so that as soon as the bell 35 is sounded, the attendant will know that the tank 11 has been filled to the desired degree. Where the air tube or pipe 20 at its lower end is extended into the liquid or the liquid rises to a point covering the open lower end of the air tube or pipe 20, the liquid will rise in the tube or pipe 20 and in this manner place the air in the tube or pipe 20 under sufficient pressure to cause the piston 32 to move upwardly or inwardly and bring the striker 34 into contact with the signal member 35. The piston 32 will gravitatingly move downwardly to an inoperative or inner position when the member 15 is withdrawn or initially inserted into the filler pipe 12.

With a device of this kind, the attendant can fill the tank under the full pressure of the fluid in the filler nozzle 10 without danger of having any of the fluid spilled out through the filler pipe 12 on account of back pressure. Where the vehicle is standing at a slight angle to the horizontal and the tank 11 is thereby disposed on an angle, it is frequently the case that considerable fuel is expelled through the filler pipe 12 before the tank 11 has been completely filled. This is due to the pocketing of air in the upper or raised end of the tank. However, with a signaling device constructed according to this invention this pocketing of air in the tank 11 will cause pressure to be formed in the lower portion of the tank 11 and in the filler pipe 12 which will be communicated to the air tube or pipe 20 by reason of the fuel rising in the air tube or pipe 20. The rising fuel in the air tube or pipe 20 will thus place the air in the tube or pipe 20 under pressure and cause the piston 32 to move upwardly and effect contact of the striker 24 with the signal member 35.

What I claim is:

1. A means for indicating the filled condition of a fluid tank during the filling thereof from a fluid discharge nozzle, said means comprising a flexible tubular fluid conducting member, an annular coupling for connecting the inner end of said member with the discharge end of the nozzle, an air tube carried by said member having a portion of its length arranged within and bearing against a part of the inner face of said member, another portion of its length arranged exteriorly of and bearing against a part of the outer face of said coupler and member, another portion of its length extending through the body of said member and connecting the said other portions together and the remaining portion of its length extending through the body of said member in proximity to the inner end of the latter and opening at the outer periphery of said member, a fluid pressure operated structure carried by said coupling connected to and opening into that portion of the tube arranged exteriorly of said member and coupling, a reciprocatory striker carried by and operated from said structure, and an audible signal carried by said coupling and made active by said striker.

2. A means for indicating the filled condition of a fluid receiving tank during the filling thereof from a fluid discharge nozzle, said means comprising a flexible tubular fluid conducting extension, a coupling sleeve connected to the outer end of said extension and to the discharge end of the nozzle, an air conducting tube connected intermediate its ends to and having portions thereof disposed interiorly and exteriorly of said extension, that portion of said tube arranged exteriorly of said extension being extended upon the outer face of said coupling, said tube including an intake end and an outlet end, said intake end opening at the outer periphery of said extension in proximity to the inner end of the latter, said outlet end being arranged exteriorly of said coupling, and a fluid pressure operated signalling structure arranged exteriorly of and supported from said coupling connected to the said extended part of the outer portion of the tube and communicating with said outlet end.

EDGAR D. FEATHERSTON.